US006789893B1

United States Patent
Hong (12)

(10) Patent No.: US 6,789,893 B1
(45) Date of Patent: Sep. 14, 2004

(54) STRUCTURE FOR COMBINING ASSISTANCE SUNGLASSES TO GLASSES

(76) Inventor: Yong Sik Hong, GreenBil APT 101-604, 110 GookWo dong, Buk-Ku, Taegu (KR)

( * ) Notice: Subject to any disclaimer, the term of this patent is extended or adjusted under 35 U.S.C. 154(b) by 0 days.

(21) Appl. No.: 10/794,874

(22) Filed: Mar. 8, 2004

(30) Foreign Application Priority Data

Jan. 30, 2004 (KR) .................................. 10-2004-0005985

(51) Int. Cl.$^7$ ................................................. G02C 9/00
(52) U.S. Cl. ............................................ 351/47; 351/57
(58) Field of Search ............................ 351/47, 57, 48, 351/58, 44, 41

(56) References Cited

U.S. PATENT DOCUMENTS

| | | | | | |
|---|---|---|---|---|---|
| 3,741,634 A | * | 6/1973 | Stoltze | ........................ | 351/57 |
| 6,089,708 A | * | 7/2000 | Ku | ................................ | 351/47 |
| 6,637,878 B2 | * | 10/2003 | Huang | ........................ | 351/47 |
| 6,698,881 B1 | * | 3/2004 | Kim | ............................. | 351/47 |
| 6,702,440 B1 | * | 3/2004 | Park | ............................. | 351/57 |
| 6,705,721 B1 | * | 3/2004 | Chen | ........................... | 351/47 |

* cited by examiner

Primary Examiner—Hung Xuan Dang
(74) Attorney, Agent, or Firm—Park & Sutton LLP; John K. Park

(57) ABSTRACT

Disclosed is a structure for combining assistance sunglasses to glasses for eyesight correction. The assistance sunglasses structure includes: a rotating device having a tube body and a supporting rod rotatably inserted into the tube body; assistance sunglasses having a connection rod protruding from the rotating device, a combining part formed at an end of the connection rod, two permanent magnets mounted on the combining part, a support fragment protruding from the upper end of the permanent magnets, and a connection pin protruding from the support fragment; and glasses having permanent magnets mounted on a rim bridge thereof, and a pin hole formed at the same position as the connection pin, wherein the connection pin is inserted into the pin hole, and at the same time, the permanent magnets are adhered to each other by their magnetic force.

3 Claims, 4 Drawing Sheets

FIG. 2
FIG. 3
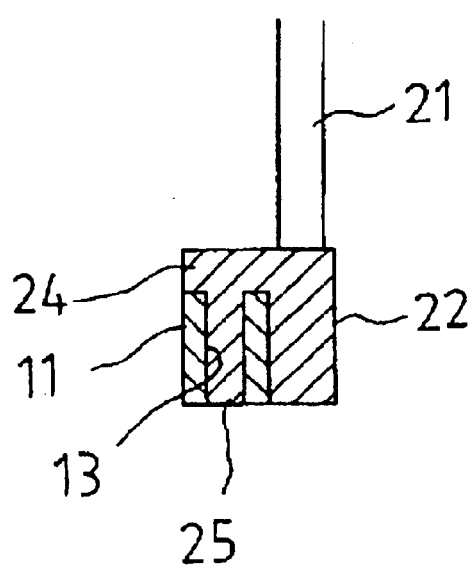
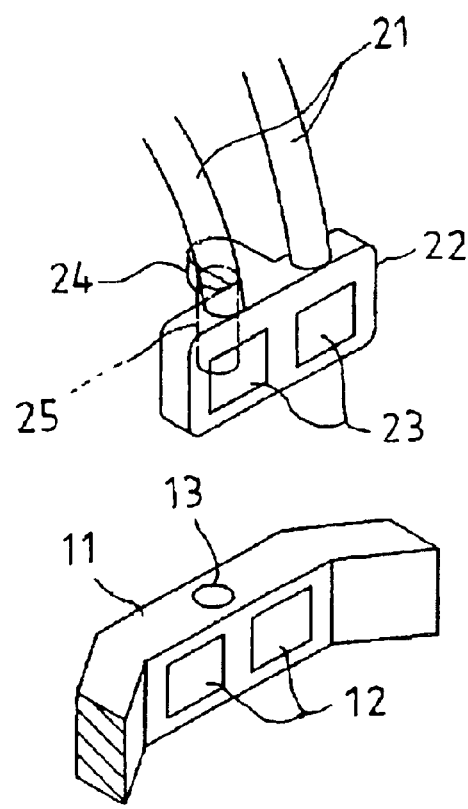

STRUCTURE FOR COMBINING ASSISTANCE SUNGLASSES TO GLASSES

CLAIMING FOREIGN PRIORITY

The applicant claims and requests a foreign priority, through the Paris Convention for the Protection of Industry Property, based on a patent application filed in the Republic of Korea (South Korea) with the filing date of Jan. 30, 2004, with the patent application number 10-2004-0005985, by the applicant. (See the Attached Declaration)

BACKGROUND OF THE INVENTION

1. Field of the Invention

The present invention relates to a structure for combining assistance sunglasses to glasses(convex lenses, concave lenses, and so on) for eyesight correction, and more particularly, to a simple structure for combining assistance sunglasses to glasses, which can allow a wearer to easily combine and separate the assistance sunglasses to and from the general glasses and prevent movement of the assistance sunglasses during the wearing of the assistance sunglasses.

2. Background of the Related Art

Recently, glasses of various kinds, which are combined with assistance glasses having no temples, have been developed and used. Such glasses can solve a problem in that a wearer has to replace the general glasses, which are worn now on the wearer's face, with sunglasses when the wearer wants to wear the sunglasses, and allow the wearer to wear the sunglasses with lenses, which have different power from the general glasses, and so, the use of the glasses combined with the assistance sunglasses have been increased and generalized.

However, in the structure for combining the assistance sunglasses to the general glasses, it is very difficult for the wearers to firmly combine the assistance sunglasses to the glasses and to separate them. On the contrary, when the wearer tries to conveniently combine or separate the assistance sunglasses to or from the glasses, the assistance sunglasses may be separated or moved during wearing.

More concretely, a structure for combining assistance sunglasses to general glasses using permanent magnets has been disclosed. However, such structure has several problems in that the assistance sunglasses may be distorted or drop down by the wearer's movement during wearing of the glasses as the combination is made only by the permanent magnets, and in that it is inconvenient to combine or separate the assistance sunglasses to or from the glasses when the permanent magnet portion is inserted into a hole, in which another permanent magnet is inserted previously, to more firmly combine the sunglasses to the glasses using the permanent magnets.

SUMMARY OF THE INVENTION

Accordingly, the present invention is directed to an assistance sunglasses structure of glasses that substantially obviates one or more problems due to limitations and disadvantages of the related art. An object of the present invention is to provide a simple structure for combining assistance sunglasses to glasses, which can allow a wearer to conveniently combine and separate assistance sunglasses to and from glasses, and to completely prevent movement or separation of the assistance sunglasses during wearing, thereby reducing a manufacturing cost of the combined glasses and sunglasses, providing a proper outward appearance during wearing, and improving convenience in use.

To achieve these objects and other advantages and in accordance with the purpose of the invention, in the structure for combining assistance sunglasses to glasses, which has a rotating device for turning the assistance glasses upwardly, the assistance glasses includes two permanent magnets mounted at an end portion of a connection rod protruding from the rotating device, and a support fragment and a connection pin protruding from the upper end of the permanent magnets, and the glasses includes permanent magnets mounted on the inner surface of a rim bridge thereof, which correspond to the permanent magnets of the connection rod, and a pin hole formed in the rim bridge to insert the connection pin of the assistance sunglasses.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 2 is an enlarged sectional view of a combined part of the present invention;

FIG. 3 is a partially enlarged view of FIG. 1;

DETAILED DESCRIPTION OF THE PREFERRED EMBODIMENT

Reference will now be made in detail to the preferred embodiments of the present invention, examples of which are illustrated in the accompanying drawings.

Figure 1:
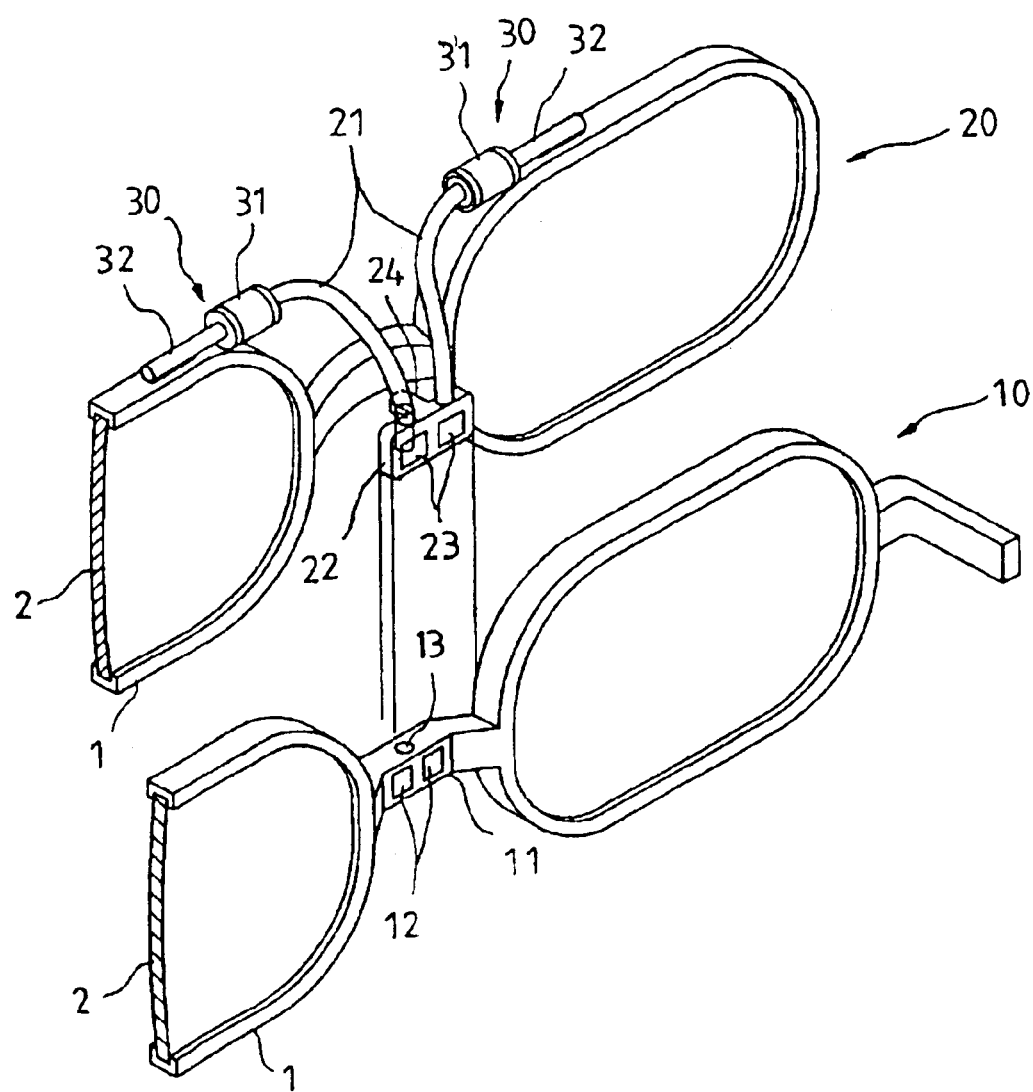
FIG. 1 is an exploded perspective view of general glasses and assistance sunglasses according to a preferred embodiment of the present invention.

FIG. 1 is an exploded perspective view of general glasses 10 and assistance sunglasses 20 according to a preferred embodiment of the present invention, FIG. 2 is an enlarged sectional view of a combined part of the present invention, and FIG. 3 is a partially enlarged view of FIG. 1.

The assistance sunglasses 20 have a rotating device 30, which is well known. As shown in the drawings, the rotating device 30 includes a tube body 31 and a supporting rod 32 rotatably inserted into the tube body 31.

According to the structure of the present invention, the assistance sunglasses 20 include a connection rod 21 protruding from the rotating device 30, a combining part 22 formed at an end of the connection rod 21, two permanent magnets 23 mounted on the combining part 22 in a horizontal direction, a support fragment 24 protruding from the upper end of the permanent magnets 23, and a connection pin 25 protruding from the support fragment 24.

Furthermore, the glasses 10 include permanent magnets 12 mounted at positions of a rim bridge 11, which correspond to the permanent magnets 23, and a pin hole 13 formed at the same position as the connection pin 25.

To combine the assistance sunglasses to the glasses, the connection pin 25 is inserted into the pin hole 13, and at the same time, the permanent magnets 23 and 12 are adhered to each other by their magnetic force.

At this time, the support fragment 24 is in a close contact with the rim bridge 11 to prevent movement of the assistance sunglasses 20 and the glasses 10 and to provide a more stable support.

Figure 4:
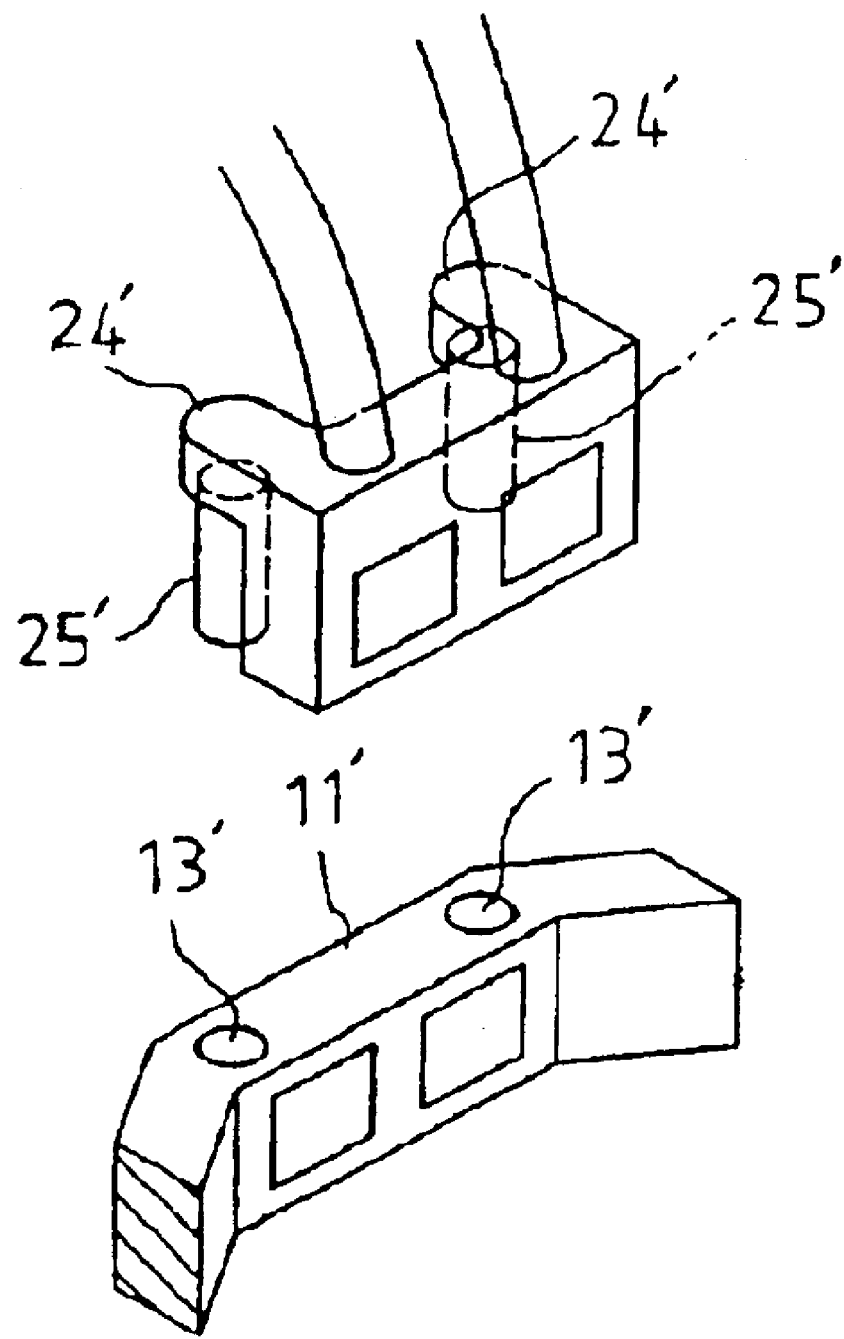
FIG. 4 is a partially exploded perspective view of another preferred embodiment of the present invention.

FIG. 4 shows another preferred embodiment of the present invention. Referring to the drawing, the assistance sunglasses 20 include two support fragments 24' formed at both sides of the upper end portion of a combining part 22' thereof, two connection pins 25' formed on the support fragments 24'. The glasses 10 have two pin holes 13' formed at the same positions of a rim bridge 11' as the connection pins 25'.

In this case, the assistance sunglasses structure can provide more firm and stable combination by the two connection pins 25' and support fragments 24'.

Figure 5:
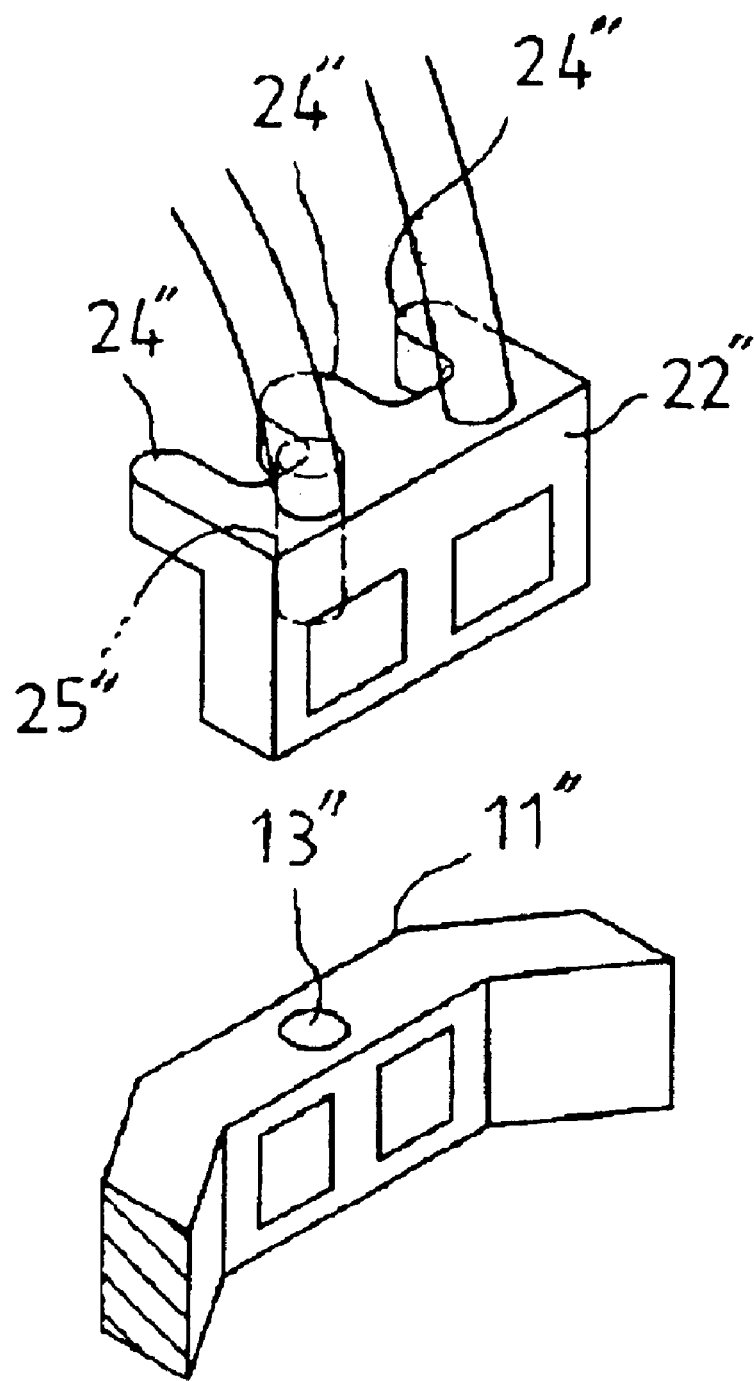
FIG. 5 is a partially exploded perspective view of a further preferred embodiment of the present invention.

FIG. 5 shows a further preferred embodiment of the present invention. Referring to the drawing, the assistance sunglasses 20 include three support fragments 24" formed on a combining part 22" thereof, a connection pin 25" formed only on a central support fragment 24" of the support fragments 24". The glasses 10 have a pin hole 13" formed at the same position of a rim bridge 11" as the connection pin 25".

In this case, the connection pin 25" is only one, but the assistance sunglasses structure can provide firm and stable supporting power due to the tree support fragments 24".

In the drawings, unexplained reference numeral 1 designates lens rims, and 2 designates lenses.

A function of the present invention according to a use method will be described as follows.

First, when the wearer wants to wear the assistance sunglasses 20 during wearing the glasses 10, the wearer inserts the connection pin 25 of the combining part 22 of the assistance sunglasses 20 into the pin hole 13 of the rim bridge 11 of the glasses 10.

When the assistance sunglasses 20 are combined to the glasses 10, as the connection pin 25 is inserted into the pin hole 13 and the permanent magnets 23 and 12 are adhered to each other by magnetic force, the assistance sunglasses 20 are not separated or moved in any directions even though there is any external force, such as shake or shock. Moreover, even though the assistance sunglasses are moved somewhat in a vertical direction, it can be returned its original position by magnetic force of the permanent magnets 23 and 12.

As described above, the present invention can provide more stable supporting power as the support fragment 24 is in a close contact with the rim bridge 11 of the glasses 10.

In case of that there is no need to wear the assistance sunglasses 20, when the wearer turns the assistance sunglasses upwardly, the rotating device 30, which has the tube body 31 and the supporting rod 32, is rotated, and then, the assistance sunglasses 20 are turned over by a rotating action of the rotating device 30 without separation from the glasses 10.

In case of that the wearer wants to separate the assistance sunglasses 20 from the glasses 10, when the wearer pulls the assistance sunglasses 20 in the upward direction, the connection pin 25 is separated from the pin hole 13, and then, the assistance sunglasses 20 are completely separated from the glasses 10.

As described above, the present invention has a simple structure for combining the assistance sunglasses to the glasses to completely prevent movement of the assistance sunglasses in any directions during wearing, thereby providing the wearers with convenient and stable use of the glasses.

The forgoing embodiments are merely exemplary and are not to be construed as limiting the present invention. The present teachings can be readily applied to other types of apparatuses. The description of the present invention is intended to be illustrative and not to limit the scope of the claims. Many alternatives, modifications, and variations will be apparent to those skilled in the art.

What is claimed is:

1. A structure for combining assistance sunglasses structure to glasses comprising:

a rotating device, which will be mounted on assistance sunglasses;

assistance sunglasses having a connection rod protruding from the rotating device, a combining part formed at an end of the connection rod, two permanent magnets mounted on the combining part in a horizontal direction, a support fragment protruding from the upper end of the permanent magnets, and a connection pin protruding from the support fragment; and glasses having permanent magnets mounted at positions of a rim bridge thereof, which correspond to the permanent magnets, and a pin hole formed at the same position as the connection pin, wherein the connection pin is inserted into the pin hole, and at the same time, the permanent magnets are adhered to each other by their magnetic force.

2. The structure for combining assistance sunglasses structure to glasses according to claim 1, wherein the assistance sunglasses include two support fragments formed at both sides of the upper end portion of a combining part thereof, two connection pins formed on the support fragments, and the glasses have two pin holes formed at the same positions of the rim bridge as the connection pins.

3. The assistance structure for combining assistance sunglasses structure to glasses according to claim 1, wherein the assistance sunglasses include three support fragments formed on a combining part thereof, a connection pin formed only on a central support fragment of the support fragments, and the glasses have a pin hole formed at the same position of the rim bridge as the connection pin.

* * * * *